(12) United States Patent
Bakulin et al.

(10) Patent No.: US 6,714,873 B2
(45) Date of Patent: Mar. 30, 2004

(54) SYSTEM AND METHOD FOR ESTIMATING SUBSURFACE PRINCIPAL STRESSES FROM SEISMIC REFLECTION DATA

(75) Inventors: Andrey Bakulin, Cambridge (GB); Bikash K. Sinha, West Redding, CT (US); Romain Charles Andre Prioul, Chesterton (GB)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 10/023,293

(22) Filed: Dec. 17, 2001

(65) Prior Publication Data

US 2003/0125878 A1 Jul. 3, 2003

(51) Int. Cl.$^7$ .............................. G01V 1/00; E21B 47/00
(52) U.S. Cl. ........................................ 702/14; 73/152.01
(58) Field of Search ..................... 702/14, 15; 367/31; 73/152.01

(56) References Cited

U.S. PATENT DOCUMENTS

| | | | | |
|---|---|---|---|---|
| 5,060,203 A | | 10/1991 | Winterstein | 367/51 |
| 5,398,215 A | * | 3/1995 | Sinha et al. | 367/31 |
| 5,475,650 A | * | 12/1995 | Sinha et al. | 367/31 |
| 5,838,633 A | * | 11/1998 | Sinha | 367/31 |
| 6,351,991 B1 | * | 3/2002 | Sinha | 73/152.01 |
| 6,473,696 B1 | * | 10/2002 | Onyia | 702/6 |
| 6,480,790 B1 | * | 11/2002 | Calvert et al. | 702/14 |

FOREIGN PATENT DOCUMENTS

| | | | | |
|---|---|---|---|---|
| SU | 1552088 A1 | 3/1990 | ......... | G01N/29/00 |
| SU | 1786273 A1 | 1/1993 | ......... | E21F/5/00 |

OTHER PUBLICATIONS

"Nonlinear elasticity and stress-induced anisotropy in rock", Johnson et al., Journal of Geophysical Research, vol. 101, No. B2, Feb. 10, 1996, pp. 3113–3124.*
"Nonlinear elasticity and stress-induced anisotropy in rock", Johnson et al., Journal of Geophysical Research, vol. 101, No. B2, Feb. 10, 1996, pp. 3113–3124.*
"An Acoustic Wave Equation for Orthorhombic Anisotropy", Alkhalifah, Stanford Exploration Project, report 98, Aug. 21, 1998.*
"Orthorhombic Anisotropy: A Physical Seismic Modeling Study", Cheadle et al., Society of Exploration Geophysics 60$^{th}$ Annual International Meeting, 1991.*

(List continued on next page.)

*Primary Examiner*—John Barlow
*Assistant Examiner*—Toan M Le
(74) *Attorney, Agent, or Firm*—William L. Wang; William B. Batzer; John J. Ryberg (57) ABSTRACT

A method and system is described for estimating stress characteristics from seismic data. The method includes receiving seismic data acquired over a region, receiving properties of rock at a location within the region, and estimating one or more stress characteristics for a sub-region by combining the seismic data and the rock properties using a relationship between the stress characteristics in the sub-region and elastic stiffness and/or sonic velocity in the sub-region. The relationship is based on a non-linear elasticity theory. The described system and method also includes analyzing in the seismic data azimuth and offset dependence of seismic signatures for seismic anisotropy thereby determining a set of anisotropic coefficients; identifying directions of minimum, intermediate and maximum stresses from orientation of principal axes of seismic anisotropy and signs of the anisotropic coefficients; and inverting the anisotropic coefficients thereby estimating magnitudes of principal stresses in the sub-region using non-linear elastic constants and vertical total stress information derived from the rock properties.

46 Claims, 2 Drawing Sheets

OTHER PUBLICATIONS

"Stress Measurement Using Rock Core in a HDR Field", Oikawa et al., Proceedings World Geothermal Congress 2000, May 28–Jun. 10, 2000.*

Bakulin, A. et al. "Ultrasonic Polarizational Method of Determination of Stress in Rock Mass". Mining Geophysics (1981), pp. 96–97.

Bakulin, A. et al. "Nonlinear Effects in Propagation of Elastic Wave Through Rocks". Proc. USSR Acad. Sc. (1982), vol. 263, No. 2, pp. 314–316.

Bakulin, A. et al. "Estimation of Azimuthal Anisotropy and Fracture Parameters from Multi–Azimuthal Walkaway VSP in the Presence of Lateral Heterogeneity". 70th Annual Int'l. Mtg. Soc. of Expl. Geophys (2000), pp. 1405–1408.

Bakulin, A. et al. "Estimation of Fracture Parameters from Reflection Seismic Data—Part II: Fractured Models with Orthorhombic Symmetry". GEOPHYSCIS, vol. 65, No. 6 (Nov.–Dec. 2000), pp. 1803–1817.

Bakulin, A. et al. "Acoustoelasticity of Rocks". St. Petersburg University Press (2000), pp. 1–310.

Bowers, G. L. "Pore Pressure Estimation from Velocity Data: Accounting for Overpressure Mechanisms Besides Undercompaction: SPE Drilling and Completion". SPE Drilling & Completion (Jun. 1995), pp. 89–95.

Eaton, B. A. "The Equation for Geopressure Prediction from Well Logs", Society of Petroleum Engineers of AIME, Paper No. SPE 5544 (1975), pp. 1–11.

Grechka, V. et al. "Joint Inversion of P– and PS–Waves in Orthorhombic Media: Theory and a Physical Modeling Study", GEOPHYSICS, vol. 64, No. 1 (Jan.–Feb., 1999), pp. 146–161.

Grechka, V. et al. "3–D Moveout Velocity Analysis and Parameter Estimation for Orthorhombic Media". GEOPHYSICS, vol. 64, No. 3 (May–Jun. 1999), pp. 820–837.

Guz, A. N. et al. "Foundations of Ultrasonic Non–Destructive Method of Measuring Stressed State in Solids" Naukova Dumka (Kiev) (1974), pp. 1–105.

Norris, A. N. et al. "Weak Elastic Anisotropy and the Tube Wave". GEOPHYSICS, vol. 58, No. 8 (Aug. 1993), pp 1091–1098.

Nur, A. et al. "An Exact Effective Stress Law for Elastic Deformation of Rock with Fluids". Journal of Geophysical Research, vol. 76, No. 26 (Sep. 10, 1971), pp 6414–6419.

Prioul, R. et al. "A Three–Parameter Model for Predicting Acoustic velocities in Transversely Isotropic Rocks Under Arbitrary Stress". 71st Annual In'l. Mtg. Soc. Expl. Geophysics, Expanded Abstracts (2001), pp. 1732–1735.

Rasolofosaon, P.. "Stress–Induced Seismic Anisotropy Revisited". Revue De L'Institut Francais du Pétrole, vol. 53, No. 5 (Sep.–Oct., 1998), pp. 679–692.

Rüger, A.. "Variation of P–Wave Reflectivity with Offset and Azimuth in Anisotropic Media". GEOPHYSICS, vol. 63, No. 3 (May–Jun., 1998), pp. 935–947.

Sinha, B. K. "Elastic Waves in Crystals Under a Bias". Ferroelectrics (1982), vol. 41, pp. 61–73.

Sinha, B. K. et al. "Dipole Dispersion Crossover and Sonic Logs in a Limestone Reservoir". GEOPHYSICS, vol. 65, No. 2 (Mar.–Apr., 2000), pp. 390–407.

Tsvankin, I. "Anisotropic Parameters and P–Wave Velocity for Orthorhombic Media". GEOPHYSICS, vol. 62, No. 4 (Jul.–Aug., 1997), pp. 1292–1309.

* cited by examiner

SYSTEM AND METHOD FOR ESTIMATING SUBSURFACE PRINCIPAL STRESSES FROM SEISMIC REFLECTION DATA

FIELD OF THE INVENTION

The present invention relates to the field of geology and geophysics. In particular the invention relates to the estimation of characteristics such as effective stresses and pore pressure from seismic data.

BACKGROUND OF THE INVENTION

Many subsurface-related human activities, like oil and gas exploration and production, mining, underground construction, and earthquake prediction, can benefit from direct estimates of the state of stress of the Earth subsurface. The importance of stress estimates increases when principal stresses are not equal to each other (non-hydrostatic stress state) and there appear some preferred directions in geological media (like directions of maximum and minimum stresses). Planning of drilling operation and mine construction are examples of applications requiring good knowledge of existing stressed state or pore fluid pressure. In this case poor estimates of effective stresses may lead to additional costs and safety problems related to geological hazards and instability of borehole or mine. Furthermore, fracture networks providing major routes for fluid flow control the development of many existing oil fields and orientation of fractures is usually controlled by direction of maximum horizontal stress. Therefore stress characterization performed prior to production may reduce risk in reservoir management decisions.

Elastic waves propagating through stressed solids contain information about applied effective stresses. These waves are usually of small amplitudes so they do not alter the investigated material. In general, velocities of propagated waves depend on unstressed elastic moduli, effective stress magnitudes and nonlinear elastic parameters. In principle, velocities of these waves may be inverted for orientations, magnitudes of principal total stresses and pore pressure.

First, such techniques were applied in non-destructive testing of materials. See e.g. Guz', A. N., Makhort, F. G., Guscha, O. I., Lebedev, V. K., 1974, Foundations of ultrasonic non-destructive method of measuring stressed state in solids: Kiev, Naukova Dumka. Easy implementation of these techniques was due to the following conditions:

A priori knowledge (measurement) of elastic moduli and nonlinear parameters of material, Unrestricted access of sources and receivers (usually transmission along direction of one of the principal stresses), Application to one or two-dimensional state of stress.

Dealing with the Earth subsurface all these assumptions are, generally, invalid. For example, in oil and gas exploration the parameters of subsurface rocks are unknown, measurements are restricted to sources and receivers all located at the surface or in borehole and stressed state is triaxial.

The use of elastic (ultrasonic) waves applied for measuring uniaxial and biaxial in situ stress in mines of Kola Peninsula has been described. See: Bakulin, V. N., and Protosenya, A. G., 1981, Ultrasonic polarizational method of determination of stress in rock mass: Collection of papers: Mining Geophysics, Tbilisi, 96–97; and Bakulin, V. N., and Protosenya, A. G., 1982, Nonlinear effects in propagation of elastic waves through rocks: Proc. USSR Acad.Sc. (Dokl.Akad.Nauk SSSR), 2, 314–316.

This technique was later updated to estimate triaxial stresses. See, Bakulin, A. V., and Bakulin, V. N., 1992, Method for determining rock mass burst danger: Patent of USSR No. 1786273. Limitations of these techniques include the requirement of two or more boreholes (transmission configuration) drilled in the formation and the assumption that all formation properties are a priori known.

Using surface shear-wave seismic or shear-wave VSP data for predicting subsurface stress regimes has been suggested. See e.g., Winterstein, D. F., 1991, Method of layer stripping to predict subsurface stress regime: U.S. Pat. No. 5,060,203. This method uses two orthogonally polarized sources of shear waves and many multicomponent receivers either at the surface or along a borehole. Layer-stripping technique allowed obtaining orientation of maximum and minimum horizontal principal stresses in each layer from polarization directions of two split shear waves at near-vertical incidence. The maximum stress is assumed along the polarization direction of fast shear wave whereas the minimum is orthogonal to it (or along the polarization direction of slow shear wave). This technique suffers from limitations including:

The method gives neither magnitudes of effective principal stresses nor differences between them.

The method uses orthogonally polarized shear wave vibrators which are expensive and rarely used modification of seismic measurements, The method does not apply to conventional PP and PS reflection data routinely used in the geophysical industry, One of principal stresses is a priori assumed vertical everywhere in the geological media. Although in many cases it is true, the method does not allow to check whether this assumption is valid or not, In reservoirs with multiple fracture sets (for example containing two sets of vertical non-orthogonal sets of fractures) shear wave polarizations would not be aligned with directions of principal stresses. The proposed measurements do not allow the revelation of such situations.

Some other models oriented towards extracting pore pressure from estimate of vertical effective stress are reported in the literature (see, Bowers, G., 1995, Pore pressure estimation from velocity data: accounting for overpressure mechanisms besides undercompaction: SPE Drilling and Completion, 10, 89–95; and Eaton, B. A., 1975, The equation for geopressure prediction from well logs: SPE, 5544, 1–11), but they typically disregard non-hydrostatic nature of the Earth stress field, i.e. assume that all principal stresses are equal to each other. The latter assumption is often violated.

Another method has been disclosed for estimating the in situ stress magnitudes of the formations using sonic borehole tool. See, Sinha, B. K., 1998, Method for estimating formation in-situ stress magnitudes using a sonic borehole tool: U.S. Pat. No. 5,838,633. This method utilizes multi-frequency inversion of sonic velocities for estimating orientation and magnitude of effective stress as well as non-linear rock properties. However, this method can have the following drawbacks:

It uses a borehole drilled into the formation where stresses are to be determined, It is designed primarily for biaxial effective stress or the difference between the maximum and minimum stress and does not estimate triaxial state of stress, It gives local estimates of effective stress field in a relatively small volume around borehole (3–4 well diameters), It does not allow obtaining 3D distribution of stress field unless very dense surface system of boreholes is drilled.

SUMMARY OF THE INVENTION

At least in part, therefore, the present invention aims to alleviate or avoid some of the aforementioned problems.

According to the invention a method is provided for estimating stress characteristics from seismic data. The method includes receiving seismic data acquired using a plurality of sensors adapted to sense seismic energy, the seismic data representing subterranean characteristics within a subterranean region, receiving properties of rock at a location within the subterranean region, and estimating one or more stress characteristics for at least a sub-region in the region by combining the seismic data and the rock properties using a relationship between the stress characteristics in the sub-region and elastic stiffness and/or sonic velocity in the sub-region.

The relationship is preferably based on an effective medium theory, and even more preferably based on a non-linear elasticity theory.

The method also preferably includes the steps of analyzing in the seismic data azimuth and offset dependence of seismic signatures for seismic anisotropy thereby determining a set of anisotropic coefficients; identifying directions of minimum, intermediate and maximum stresses from orientation of principal axes of seismic anisotropy and signs of the anisotropic coefficients; and inverting the anisotropic coefficients thereby estimating magnitudes of principal stresses in the sub-region using non-linear elastic constants and vertical total stress information derived from the rock properties.

According to the invention a method is also provided for estimating pore pressure from seismic data.

The invention is also embodied in a system for estimating stress characteristics, and in a computer readable medium that is capable of causing a computer to estimate stress characteristics from seismic data.

DETAILED DESCRIPTION

There is an important feedback loop between subsurface-related activities and the state of effective stress. Changes in the initial effective stress distribution strongly affects the activity itself. Examples of such activities include drilling, mining, and pumping of fluids in/out of a subsurface structure. An example of this feedback loop is a wellbore or mine instability caused by extracting fluids or rock itself. 4D (3D in space and 1D in time) monitoring of the state of stress, for example during oil and gas exploration or mining, can reduce the risk of different hazards, optimize the decisions and reduce the cost.

According to the present invention, a method is provided for estimating the orientations and magnitudes of subsurface principal stresses as well as pore pressure utilizing 3D surface reflection seismic data including PP, PS and SS reflections. The method primarily relies on analyzing the dependence of reflected traveltime with offset and azimuth, although amplitude information may be also used in combination to provide redundancy. Anisotropic coefficients extracted from traveltimes contain information on subsurface stress. Using core or borehole measurements of certain nonlinear parameters of rocks, the whole effective stress tensor can be estimated for relatively large areas such as more than 100 square meters or for a particular horizon or layer of rock at a specified depth. This may be repeated for any interval of the geologic section to obtain depth behavior of stress field. Repeating this process in time allows 4D monitoring of stress. While known method can be used to estimate stress characteristics within the region in the immediate vicinity of a borehole, the present method can make stress characteristics estimates at locations away from the nearest existing borehole, for example more than 5 meters away.

Figure 1:
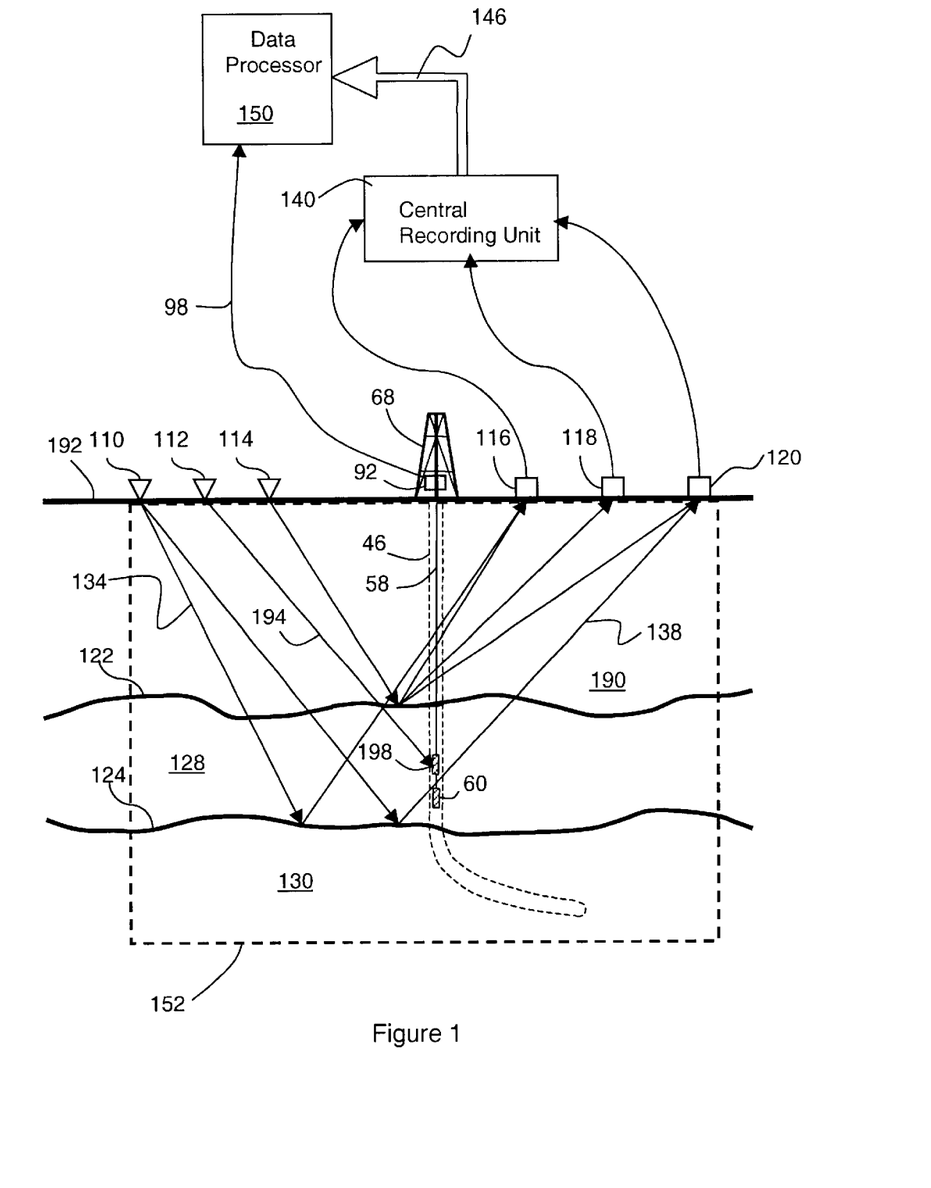
FIG. 1 shows a system for estimating principal stresses from seismic reflection data, according to a preferred embodiment of the invention.

FIG. 1 shows a system for estimating principal stresses from seismic reflection data, according to a preferred embodiment of the invention. Borehole 46 is located in the earth 190 having a surface 192. According to the invention a sonic borehole tool 60 is deployed in borehole 46 on a wireline 58 as shown. Alternatively, sonic borehole tool 60 could be provided in the bottom hole assembly disposed at the lower end of a drillstring (not shown). On the surface, rig 68 is provided as well as a wireline truck (not shown). Although the system is shown in FIG. 1 as being on land, those of skill in the art will recognize that the present invention is equally applicable to marine environments. Receiver 92 on rig 68 receives, records and transmits the data to data processor 150 via connection 98.

Also shown in FIG. 1 is a system for acquiring multi-component P and S-wave seismic data in a region 152. As shown, seismic sources 110, 112, and 114 impart seismic energy into the earth at its surface 192 at predetermined times upon command of a controller (not shown). The seismic sources may comprise impulsive sources (such as explosives, or in the marine environment, airguns) or vibratory sources. While three sources are depicted for simplicity, other numbers of sources, including a single source, could be used. Although shown on land, in general the seismic data acquisition could be carried out on land, marine, or transition-zone environments. The seismic energy imparted by the sources travels through the earth in the form of both p and s waves; this is schematically depicted in FIG. 1 as, for example, arrow 134. The energy reflects off of certain subterranean surfaces, here depicted as surface 122 and surface 124, and eventually reach and are detected by receivers 116, 118, and 120 as depicted, for example, by arrow 138. According to the preferred embodiment, receivers 116, 118 and 120 are multicomponent geophones. Although only three receivers are shown in FIG. 1, there could be more receivers used in a particular embodiment.

According to an alternative embodiment the seismic acquisition system can be arranged to acquire Multi-azimuth walkaway VSP data in borehole 46. In FIG. 1 only one azimuth is shown although there would be sources placed along other azimuths as well. The seismic energy is depicted as arrow 194. The seismic receiver 198 is ordinarily deployed in vertical section of the well via a wireline 58 from a wireline truck (not shown). Alternatively, the seismic receiver could be deployed on a drillstring to acquire seismic data during the drilling operation. Note that although a single wireline 58 is shown deploying seismic receiver 198 and sonic borehole tool 60, typically these measurements would be done separately on separate wirelines.

In the case of the marine environment, the receivers 116, 118 and 120 are preferably located on an ocean bottom cable lying on the sea bottom.

Cap rock 128 is relatively impermeable to the hydrocarbon substance. The hydrocarbon substance is thereby trapped in hydrocarbon reservoir 130. Hydrocarbon reservoir 130 is typically made up of a reservoir rock (for example sandstone in a sand channel) and the interface between it and the cap rock 128 reflects the seismic energy back to the receivers as depicted by arrow 138.

Receivers 116, 118, and 120 convert the seismic energy into electrical signals and transmit these signals to a central recording unit 140. In the case of land acquisition this central recording unit 140 is typically located at the local field site, and in marine acquisition it is typically located on the vessel used to tow the sources and receivers (not shown). Once the central processing unit 140 performs correlation and other desired processing, it typically stores the data in the form of time-domain traces on a magnetic tape. The data, in the form of magnetic tape is later sent for processing and analysis to a seismic data processing center, typically located in some other geographical location. The data transfer from the central recording unit 140 in FIG. 1 is depicted as arrow 146 to a data processor 150.

Figure 2:
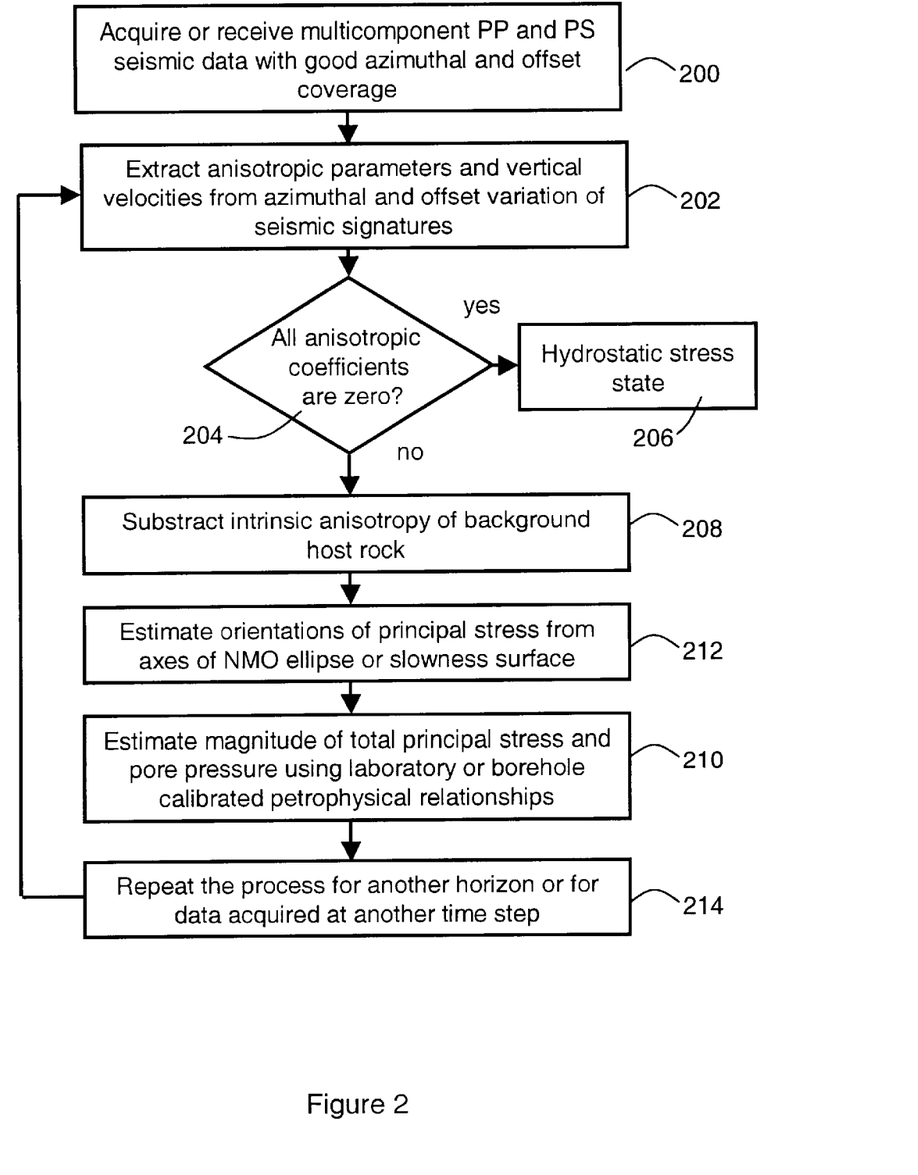
FIG. 2 depicts a workflow for estimating orientations and magnitudes of subsurface principal stresses, according to a preferred embodiment of the invention.

FIG. 2 depicts a workflow for estimating orientations and magnitudes of subsurface principal stresses, according to a preferred embodiment of the invention. Conventional 3D marine, land, OBS (ocean-bottom seismic), VSP (vertical seismic profiling) or other kind of seismic data can be utilized.

As shown in FIG. 2, the basic steps of the method are included in the following. In step 200 multicomponent PP and PS seismic data are acquired or received, preferably with good azimuthal and offset coverage. In step 202 anisotropic parameters and vertical velocities are extracted from azimuthal and offset variation of seismic signatures. In step 204 a decision is made based on whether all the anisotropic coefficients are zero. If they are equal to zero, the region of interest is in a hydrostatic state, step 206. If the answer in step 204 is 'no', then the intrinsic anisotropy of the background host rock is subtracted, in step 208. In step 212, the orientations of the principal stress are estimated from the axes of NMO ellipse or slowness surface. In step 210, the magnitude of total principal stress and pore pressure are estimated using laboratory or borehole calibrated petrophysical relationships. In step 214 the process is repeated for another horizons or for data acquired at another time step.

Estimation of Anisotropic Parameters from Seismic Data

Further detail of the preferred techniques for estimating anisotropic parameters from reflection siesmic data, step 202 in FIG. 2, will now be described. Although the method according to the invention can make use of any kind of seismic data (conventional 3D marine, land, OBS, VSP etc.), it is preferred that good azimuth and offset coverage is obtained.

Anisotropic processing allows one to estimate relevant anisotropic coefficients of particular horizons assuming specific model of seismic anisotropy. In this disclosure we concentrate on the model of orthorhombic media (ORT) as a general model for triaxially stressed rock that was initially isotropic (or weakly anisotropic). Vertical (VTI) and horizontal (HTI) transverse isotropy are considered as special cases of ORT media. See, Tsvankin, I., 1997, Anisotropic parameters and P-wave velocity for orthorhombic media: Geophysics, 62, 1292–1309, and Grechka, V., and Tsvankin, I., 1999, 3-D moveout velocity analysis and parameter estimation in orthorhombic media: Geophysics, 64, 820–837. In general, any other model could be treated in a similar way. In this description we also assume that one of symmetry planes of ORT media is horizontal or equivalently one of the principal stresses is vertical. Although this is often the case in the subsurface, we can verify this assumption from the data in each case.

Techniques for the estimation of anisotropic coefficients of ORT media have been described previously and are based on analysis of azimuth and offset dependence of different seismic signatures. See e.g., Rüger, A., 1998, Variation of P-wave reflectivity with offset and azimuth in anisotropic media: Geophysics, 63, 935–947; Tsvankin, I., 1997, Anisotropic parameters and P-wave velocity for orthorhombic media: Geophysics, 62, 1292–1309; Grechka, V., and Tsvankin, I., 1999, 3-D moveout velocity analysis and parameter estimation in orthorhombic media: Geophysics, 64, 820–837; and Grechka, V., Theophanis, S., and Tsvankin, I., 1999, Joint inversion of P- and PS-waves in orthorhombic media: Theory and a physical-modeling study: Geophysics, 64, 146–161. The output of these techniques is interval anisotropic coefficients obtained by Dix differentiation or AVOA (amplitude versus offset and azimuth) analysis. See, Grechka and Tsvankin, 1999; Grechka et al., 1999; and Rüger, 1998.

In the ORT model, seismic signatures are controlled by 9 parameters: $V_{P0}$, $V_{S0}$, $\epsilon^{(1)}$, $\delta^{(1)}$, $\gamma^{(1)}$, $\epsilon^{(2)}$, $\delta^{(2)}$, $\gamma^{(2)}$, $\delta^{(3)}$ (see below in the section called "Anisotropic parameters for orthorhombic media"). Here $V_{P0}$ and $V_{S0}$ are respectively P- and S-waves vertical velocities. All other parameters are called anisotropic coefficients (See, Tsvankin, 1997) and non-zero value of any of them indicates the presence of seismic anisotropy (in isotropic media all anisotropic coefficients are identically zero).

Depending on the data available, there are multiple scenarios among which we select three typical ones for exemplary discussion herein:

Scenario 1: Conventional 3D P-wave data (no wells) allows estimation of $\delta^{(2)}-\delta^{(1)}$, $\eta^{(1)}$, $\eta^{(2)}$ and $\eta^{(3)}$.

Scenario 2: Multi-azimuth walkaway VSP in borehole allows estimation of $V_{P0}$, $\epsilon^{(1)}$, $\delta^{(1)}$, $\epsilon^{(2)}$, $\delta^{(2)}$, $\delta^{(3)}$.

Scenario 3: Multicomponent OBC-data (PP and PS data, no wells) allows estimation of all nine parameters $V_{P0}$, $V_{S0}$, $\epsilon^{(1)}$, $\delta^{(1)}$, $\gamma^{(1)}$, $\epsilon^{(2)}$, $\delta^{(2)}$, $\gamma^{(2)}$, $\delta^{(3)}$.

Scenario 1 utilizes azimuthal variation of P-wave NMO (normal moveout velocity) from horizontal and dipping reflectors or non-hyperbolic moveout (see, Grechka and Tsvankin, 1999). Scenario 2 utilizes inversion of P-wave slowness. See, Bakulin, A., Slater, C., Bunain, H. and Grechka, V., 2000, Estimation of azimuthal anisotropy and fracture parameters from multiazimuthal walkaway VSP in the presence of lateral heterogeneity, 70th Ann. Internat. Mtg: Soc. of Expl. Geophys., 1405–1408. Scenario 3 utilizes azimuthal variation of NMO velocity of PP, P-SV and P-SH reflections (see, Grechka et al., 1999). Many other different scenarios are available including those utilizing amplitude versus offset and azimuth analysis (see, Rüger, 1998).

Estimation of Orientations of Principal Stresses

Further details of the preferred techniques for estimating orientations of principal stresses, step 212 in FIG. 2, will now be described. For rocks, which are isotropic in the absence of stress, the orientation of principal stress, directions coincide with the orientation of principal axes of ORT media (see below in the section called Anisotropic parameters for orthorhombic media). These orientations can be readily determined, for example in each scenario above:

Scenario 1: As principal axes of NMO ellipse of P-wave from horizontal reflector, Scenario 2: As principal axes of P-wave slowness surface, Scenario 3: As principal axes of NMO ellipses of P, S1 and S2 waves from horizontal reflectors.

Scenario 3 allows a check on the assumption of initially isotropic rock: if this is invalid then principal axes of 3 different NMO ellipses of P, S1 and S2 waves would not be aligned.

Estimation of Magnitudes of Principal Stresses

Further detail of step 210 in FIG. 2 will now be described according to preferred embodiments of the invention.

Relationships Between Seismic Signatures and Effective Stresses

The underlying basis for the extraction of the magnitudes is the dependence of the effective elastic stiffnesses of rock on effective stress (see the description below in the section called "Stress dependence of effective elastic constants"). Effective stresses $T_{ij}$ are defined to be the differences between the total stresses $\sigma_{ij}$, and the pore pressure $P_p$:

$$T_{ij} = \sigma_{ij} - \alpha P_p \delta_{ij},$$

where $\alpha$ is the Biot coefficient (see, Nur, A. and Byerlee, J. D., 1971, An exact effective stress law for elastic deformation of rock with fluids, J. Geophys. Res., 76, 6414–6419) which can be measured from laboratory measurements on cores or first approximated as close to 1, and $\delta_{ij}=1$ if i=j and 0 otherwise.

Formulae (23) are valid for rocks that are isotropic in the absence of any stress or isotropic under any hydrostatically stressed state. As in practice we do not measure stiffnesses, but rather seismic signatures such as vertical velocities $V_{P0}$, $V_{S0}$ and anisotropic parameters $\epsilon^{(1)}$, $\delta^{(1)}$, $\gamma^{(1)}$, $\epsilon^{(2)}$, $\delta^{(2)}$, $\gamma^{(2)}$, $\delta^{(3)}$, the preferred intermediate step is to relate vertical velocities and anisotropic coefficients measured from seismic to effective stress magnitudes.

Exact relationships (23) for anisotropic parameters can be difficult to analyze, although we can use them numerically in the inversion. To get a useful insight into the problem it is preferred to use a weak-anisotropy approximation. As anisotropy usually observed in the rocks is weak, this approximation has been established as an important tool for scientific and engineering analysis of subsurface seismic anisotropy. For stressed rock weak anisotropy approximation [$\Delta c_{ij} z, 1\ z, 1\ 1$ in equations (23)] provides the following relationships between anisotropic coefficients of ORT model measured from seismic and effective stress magnitudes:

$$\varepsilon_c^{(2)} = \delta_c^{(2)} = \frac{K_p}{2c_{44}^0}(T_{11} - T_{33}),\ \gamma_c^{(2)} = \frac{K_s}{2c_{44}^0}(T_{11} - T_{33}) \quad (1)$$

$$\varepsilon_c^{(1)} = \delta_c^{(1)} = \frac{K_p}{2c_{44}^0}(T_{22} - T_{33}),\ \gamma_c^{(1)} = \frac{K_s}{2c_{44}^0}(T_{22} - T_{33})$$

$$\delta_c^{(3)} = \varepsilon^{(1)} - \varepsilon^{(2)} = \frac{K_p}{2c_{44}^0}(T_{22} - T_{11})$$

$$K_p = \frac{2c_{155}}{c_{33}^0},\ K_s = \frac{c_{456}}{c_{44}^0}$$

where $c_{155}$ and $c_{456} = (c_{155} - c_{144})/2$ are two of the three third-order (non-linear) elastic constants of rock (see the description below in the section called "Stress dependence of effective elastic constants"), and $c_{33}^0$ and $c_{44}^0$ are the two second-order elastic constants (or Lame parameters). Clearly, equations (1) allow an estimation of the magnitudes of the differences between principal stresses. Therefore, one of the total principal stresses should be calculated independently. In addition, this estimation requires knowledge of $K_p$ and $K_s$ which are functions of second-order elastic constants and non-linear constants of the formation.

Note that all three anellipticity parameters defined by (20)–(22) are zero $\eta^{(1)} = \eta^{(2)} = \eta^{(3)} = 0$, which means that triaxially stressed medium always possesses elliptical ORT anisotropy with only 6 independent parameters. Similar expressions for another Thomsen-style anisotropic coefficients were derived by Rasolofosaon who first noted that stress-induced orthorhombic media has close to zero anellipticity parameters in all symmetry planes. See, Rasolofosaon, P. N. J., 1998, Stress-induced seismic anisotropy revisited: Revue De L'Institut Francais Du Petrole, 53(5), 679–692. Therefore, the identification of anellipticity ($\eta^{(1)} \neq 0$, $\eta^{(2)} \neq 0$, $\eta^{(3)} \neq 0$) reveals the presence of intrinsic anisotropy in the formation. If unstressed rock is itself anisotropic (due to alignment of shale particles, fine layering of sand/shales etc.) then total observed anisotropy would be a sum of intrinsic and stress-induced anisotropies. To obtain only stress-induced part, we have to remove the contribution from background anisotropy. This may be approximately done by subtracting anisotropic coefficients of background from corresponding observed anisotropic coefficients. See, Bakulin, A., Grechka, V., and Tsvankin, I., 2000, Estimation of fracture parameters from reflection seismic data-Part II: Fractured models with orthorhombic symmetry: Geophysics, 65, 1803–1817. For example, in typical case of vertical transverse isotropy of background formation, characterized by three Thomsen anisotropic coefficients $\epsilon_b$, $\delta_b$, $\gamma_b$, this correction is achieved by:

$$\epsilon_c^{(i)} = \epsilon^{(i)} - \epsilon_b,\ \delta_c^{(i)} = \delta^{(i)} - \delta_b,\ \gamma_c^{(i)} = \gamma^{(i)} - \gamma_b,\ (i=1,2),\ \text{and}\ \delta_c^{(3)} = \delta^{(3)}. \quad (2)$$

Background parameters $\epsilon_b$, $\delta_b$, $\gamma_b$ are estimated from cores, logs or other sources of information.

Estimating Rock Formation Parameters

Rock formation properties such as second-order elastic and third-order (nonlinear) constants of rock are estimated from laboratory core measurements (see, Bakulin, A. V., and Bakulin, V. N., 1990, Device for measuring mechanical properties of materials: Patent of USSR No. 1552088; and Prioul, R., Bakulin, A. and Bakulin, V., 2001, Three parameter model for predicting acoustic velocities in transversely isotropic rocks under arbitrary stress: 71$^{st}$ Ann. Internat. Mtg., Soc. Expl. Geophys., Expanded Abstracts, 1732–1735.), borehole measurements (see, Norris, A. N., Sinha, B. K., 1993, Weak elastic anisotropy and the tube wave, Geophysics, 58, 1091–1098; Sinha, B. K., Kostek, S., 1995, Measurement of nonlinear properties of formation using sonic borehole tool while changing pressure in borehole: U.S. Pat. No. 5,475,650; Sinha, B. K., Kane, M. R. and Frignet, B., 2000, Dipole dispersion crossover and sonic logs in a limestone reservoir: Geophysics, 65, 390–407; and co-pending U.S. patent application entitled "Determining Stress Parameters of Formations from Multi-Mode Velocity Data" application Ser. No. 09/588,934 filed on Jun. 4, 2000.) or any other sources of information. In the absence of any information the Lame parameters of rock are approximated by:

$$\mu = c_{44}^0 = \rho V_{S0}^2,\ \lambda = c_{33}^0 - 2c_{44}^0 = \rho V_{P0}^2 - 2\mu, \quad (3)$$

where $V_{P0}$ and $V_{S0}$ are vertical velocities of P and S waves in ORT model.

Estimating Vertical Total Stress

Among three total principal stresses, generally most robust way exists to estimate magnitude of vertical stress. Vertical total principal stress is preferably estimated from density logs according to the formula:

$$\sigma_{33} = -\int_0^{depth} \rho(z) g \, dz, \quad (4)$$

where $\rho(z)$ is density of the formation as function of depth and $g$ is gravitational constant. Alternatively $\sigma_{33}$ can be taken from similar depths of neighboring wells, estimated from geodynamic reconstructions or any other sources of information.

Estimating Horizontal Total Stresses

The two remaining total principal stresses in the horizontal plane are estimated from known vertical stress and anisotropic coefficients either numerically from exact expressions (see below in the section called "Stress dependence of effective elastic constants") or from (3). For different scenarios using (3), one could:

1. Estimate magnitude of the difference between effective or total horizontal principal stresses according to the formula:

$$T_{22} - T_{11} = \sigma_{22} - \sigma_{11} = \frac{2c_{44}^0}{K_p}(\delta^{(1)} - \delta^{(2)}). \quad (5)$$

2. Estimate magnitudes of both remaining total principal stresses according to the formulae:

$$\sigma_{11} = \sigma_{33} + \frac{2c_{44}^0}{K_p}\delta^{(2)}, \quad (6)$$

$$\sigma_{22} = \sigma_{33} + \frac{2c_{44}^0}{K_p}\delta^{(1)}. \quad (7)$$

Some redundancy in this case is provided by additional check:

$$T_{22} - T_{11} = \sigma_{22} - \sigma_{11} = \frac{2c_{44}^0}{K_p}\delta^{(3)}. \quad (8)$$

3. The same as in previous scenario plus two more redundant checks in the form:

$$\sigma_{11} = \sigma_{33} + \frac{2c_{44}^0}{K_s}\gamma^{(2)}, \quad (9)$$

$$\sigma_{22} = \sigma_{33} + \frac{2c_{44}^0}{K_s}\gamma^{(1)}. \quad (10)$$

Note that in all three scenarios, one can validate whether elliptical anisotropy assumption is valid by checking the constraints $\eta^{(1)} = \eta^{(2)} = \eta^{(3)} = 0$. If these conditions are not satisfied it means that either assumption of initially isotropic rock is not valid or correction for intrinsic anisotropy was not good enough and requires another iteration.

Finally estimation of uncertainty in orientation of NMO ellipse axes and anisotropic parameters may be found. See, Grechka, V. and Tsvankin, I., 1999, 3-D moveout velocity analysis and parameter estimation for orthorhombic media: Geophysics, Soc. of Expl. Geophys., 64, 820–837.

EXAMPLE

Following is an example of a preferred embodiment of the invention as applied to a synthetic dataset. 3D OBC (ocean-bottom cable) seismic data were processed to obtain the following parameters of sedimentary layer: $V_{P0}=1707$ m/s, $V_{S0}=585$ m/s, $\epsilon^{(1)}=0.170$, $\delta^{(1)}=0.185$, $\gamma^{(1)}=0.161$, $\epsilon^{(2)}=-0.113$, $\delta^{(2)}=-0.107$, $\gamma^{(2)}=-0.070$, $\delta^{(3)}=0.447$. Axis $x_3$ of ORT model is vertical whereas the two other axes $x_1$ and $x_2$ are horizontal. Orientation of the $x_1$ axis is N20°E(20° from North towards East). These parameters were computed using exact equations (11)–(19), (23)–(24) and correspond to a model of initially isotropic layer ($\rho=2400$ kg/m³, $V_{P0}=1694$ m/s, $V_{S0}=570$ m/s) under triaxial stressed state. The principal stresses are aligned with symmetry axes of ORT model and have magnitudes $\sigma_{11}=-8$ MPa, $\sigma_{22}=-18$ MPa, $\sigma_{33}=-12$ MPa and pore pressure $P_p=0$ MPa. A minus sign corresponds to compressive stress. Third-order non-linear constants are $c_{111}=-608.6$ GPa, $c_{112}=25.4$ GPa, $c_{123}=201.2$ GPa ($c_{155}=-158.5$ GPa, $c_{456}=-35.3$ GPa).

Interpretation and stress estimation is performed in the following steps:

1. Calculating $\eta^{(1)} \approx -0.011, \eta^{(2)} \approx -0.008, \eta^{(3)} \approx -0.042$ using equations (20)–(22) we validate the assumption of almost elliptical anisotropy ($\eta^{(1)} \approx 0, \eta^{(2)} \approx 0, \eta^{(3)} \approx 0$) which is indication of stressed isotropic rock.
2. Identify the directions of principal stresses with the directions of principal axes of ORT model,
3. Qualitative interpretation of stress regime may be performed based on signs of anisotropic coefficients from (1) without knowing properties of the formation. Assume that from neighboring fields we only know that sign of third-order non-linear constants $c_{155}$ and $C_{456}$ for an interested horizon is negative (usual case for rocks). It implies that coefficients $K_p$ and $K_s$ from equations (1) are also negative. From equations (6)–(7) we immediately estimate that $\delta^{(1)} > 0$ and $\delta^{(2)} < 0$ implies $\sigma_{22} < \sigma_{33} < \sigma_{11}$. Alternatively the same conclusion may be obtained from equations (9)–(10) and relationships: $\gamma^{(1)} > 0$ and $\gamma^{(2)} < 0$. Finally, from $\delta^{(3)} > 0$ and equation (8) we confirm that $\sigma_{22} < \sigma_{11}$. By using all anisotropic coefficients, we obtain independent estimates that should agree with each other if anisotropy is stress-induced.

Assuming all principal stresses to be compressive (negative) at this stage we predicted the stress regime $|\sigma_{22}| |\sigma_{33}| < |\sigma_{11}|$ and found that minimum ($\sigma_{11}$) and maximum ($\sigma_{22}$) principal stresses are horizontal with orientations N20°E and N110°E respectively, whereas intermediate one is vertical.

4. Quantitative estimates of stress magnitudes may be accomplished only if at least one non-linear constant of the formation is known as well as magnitude of vertical stress. Estimated formation properties and vertical stress used for the inversion are listed against actual ones in the Table 1.

TABLE 1

Comparison of the actual model parameters with their estimations [formulae (4) and (3)] used for stress magnitudes inversion.

|  | $c_{456}$, GPa | $\lambda$, GPa | $\mu$, GPa | $\sigma_{33}$, MPa |
|---|---|---|---|---|
| Estimated | −35.3 | 5.35 | 0.82 | −12 |
| Actual | −35.3 | 5.32 | 0.78 | −12 |

In this example, it is assumed that the exact value of only one constant $c_{456}$ is known from either borehole (Sinha and Kostek, 1995) or core measurements (Bakulin and Bakulin, 1990). Lame parameters of unstressed rock are approximated by seismic vertical velocities from equations (3).

Vertical stress $\sigma_{33}$ is estimated from equation (4) taking depth from seismic data z=600 m and average formation density 2050 kg/m3.

Equations (9)–(10) are inverted for stress magnitudes and then the value of $c_{155}$ is estimated from equation (6) (Table 2). When value of $c_{155}$ is known, another estimate of $\sigma_{22}$ (Table 2, in brackets) may be obtained from equation (7).

TABLE 2

Comparison of the actual stresses with those estimated by inverting the anisotropic coefficients [equations~ (6) -- (10)] and using approximate formation properties from Table 1.

|  | $\sigma_{11}$, MPa | $\sigma_{22}$, MPa | $c_{155}$, GPa |
| --- | --- | --- | --- |
| Estimated | −7.5 | −18.3 (−19.1) | −140.2 |
| Actual | −8 | −18 | −158.5 |

The example shows that the method provides estimated orientations and magnitudes of principal stresses with enough accuracy to be used in a variety of applications in oil and gas industry, mining, construction etc. Although in this discussion we have used weak-anisotropy approximations for the inversion, precise numerical inversion can be performed using exact equations (11)–(19), (23)–(24).

Pore Pressure Estimation

According to the invention, the described methods can also be used to estimate pore pressure. Under stress, the vertical P- and S- wave velocities are related by the expressions (23) and can simplified when using the fact that for rocks $c_{ijk} \gg c_{mn}^0 \gg T_{pq}$:

$$\rho V_{P0}^2 = c_{33} = c_{33}^0 + c_{111}E_{33} + c_{112}(E_{11}+E_{22}) \quad (25)$$

$$\rho V_{S0}^2 = c_{55} = c_{44}^0 + c_{144}E_{22} + c_{155}(E_{11}+E_{33}) \text{ (S-wave polarized in the } x_1\text{-direction)}$$

where $T_{ij}$ and $E_{ij}$ are effective principal stresses and strains related by Hooke's law (equation 24), $c_{33}^0$, $c_{44}^0$ are the second-order elastic constants of rock and $c_{111}$, $c_{112}$, $c_{144}$, $c_{155}$ are the third-order nonlinear elastic constants (see the discussion below called "Stress dependence of effective elastic constants").

The pore fluid pressure is further estimated using vertical effective stress $T_{33}$ (estimated when solving numerically equations (23)) and vertical total effective stress $\sigma_{33}$. Then, pore pressure is $P = \sigma_{33} - T_{33}$. As used herein the term "pore pressure" refers to the pore fluid pressure.

Alternatively, the pore pressure can also be estimated using the knowledge of the total principal stresses $\sigma_{11}$, $\sigma_{22}$, $\sigma_{33}$ given above, one of the equations (25) for the vertical velocities $V_{P0}$ and $V_{S0}$ and equation (24). Some redundancy is provided with the non-used vertical velocity equation.

Seismic Monitoring of Stress Magnitudes

The described process of estimating stress magnitudes and pore pressure using calibrated relationships (23) or approximate ones (1) can be also repeated at different time steps.

Anisotropic Parameters for Orthorhombic Media

The basic set of the anisotropic parameters for orthorhombic media was introduced by Tsvankin (1997). His notation contains the vertical velocities of the P-wave and the ones of the S-wave and seven dimensionless Thomsen-type anisotropic coefficients. The definitions of those parameters in terms of the stiffnesses $c_{ij}$ and density $\rho$ are given below:

$V_{P0}$—the P-wave vertical velocity:

$$V_{P0} = \sqrt{\frac{c_{33}}{\rho}} \quad (11)$$

$V_{S0}$—the vertical velocity of the S-wave polarized in the $x_1$-direction:

$$V_{S0} = \sqrt{\frac{c_{55}}{\rho}} \quad (12)$$

$\epsilon^{(2)}$—the VTI parameter $\epsilon$ in the $[x_1,x_3]$ symmetry plane normal to the $x_2$-axis (this explains the superscript "2" of $\epsilon$):

$$\varepsilon^{(2)} = \frac{c_{11} - c_{33}}{2c_{33}} \quad (13)$$

$\delta^{(2)}$—the VTI parameter $\delta$ in the $[x_1,x_3]$ plane:

$$\delta^{(2)} = \frac{(c_{13} + c_{55})^2 - (c_{33} - c_{55})^2}{2c_{33}(c_{33} - c_{55})} \quad (14)$$

$\gamma^{(2)}$—the VTI parameter $\gamma$ in the $[x_1,x_3]$ plane:

$$\gamma^{(2)} = \frac{c_{66} - c_{44}}{2c_{44}} \quad (15)$$

$\epsilon^{(1)}$—the VTI parameter $\epsilon$ in the $[x_2,x_3]$ symmetry plane:

$$\varepsilon^{(1)} = \frac{c_{22} - c_{33}}{2c_{33}} \quad (16)$$

$\delta^{(1)}$—the VTI parameter $\delta$ in the $[x_2,x_3]$ plane:

$$\delta^{(1)} = \frac{(c_{23} + c_{44})^2 - (c_{33} - c_{44})^2}{2c_{33}(c_{33} - c_{44})} \quad (17)$$

$\gamma^{(1)}$—the VTI parameter $\gamma$ in the $[x_2,x_3]$ plane:

$$\gamma^{(1)} = \frac{c_{66} - c_{55}}{2c_{55}} \quad (18)$$

$\delta^{(3)}$—the VTI parameter $\delta$ in the $[x_1,x_2]$ plane:

$$\delta^{(3)} = \frac{(c_{12} + c_{66})^2 - (c_{11} - c_{66})^2}{2c_{11}(c_{11} - c_{66})} \quad (19)$$

These nine parameters fully describe wave propagation in general orthorhombic media. In particular applications, however, it is convenient to operate with specific combinations of Tsvankin's parameters. For example, P-wave NMO velocity from dipping reflectors depends on three coefficients $\eta$, which determine the anellipticity of the P-wave slowness in the symmetry planes (Grechka and Tsvankin, 1999). The definitions of $\eta^{(1,2,3)}$ are analogous to that of Alkhalifah-Tsvankin coefficient $\eta$ in VTI media:

$\eta^{(1)}$—the VTI parameter $\eta$ in the $[x_2, x_3]$ plane:

$$\eta^{(1)} = \frac{\varepsilon^{(1)} - \delta^{(1)}}{1 + 2\delta^{(1)}} \quad (20)$$

$\eta^{(2)}$—the VTI parameter $\eta$ in the $[x_1, x_3]$ plane:

$$\eta^{(2)} = \frac{\varepsilon^{(2)} - \delta^{(2)}}{1 + 2\delta^{(2)}} \quad (21)$$

$\eta^{(3)}$—the VTI parameter $\eta$ in the $[x_1, x_2]$ plane:

$$\eta^{(3)} = \frac{\varepsilon^{(1)} - \varepsilon^{(2)} - \delta^{(3)}(1 + 2\varepsilon^{(2)})}{(1 + 2\varepsilon^{(2)})(1 + 2\delta^{(3)})} \quad (22)$$

Stress Dependence of Effective Elastic Constants

We assume that medium in the reference state is isotropic with two elastic constants ($c_{11}^0 = c_{33}^0$, $c_{44}^0 = c_{66}^0$, $c_{12}^0 = c_{13}^0 = c_{11}^0 - 2c_{66}^0$ or Lame parameters $\lambda = c_{33}^0 31\ 2c_{44}^0$ and $\mu = c_{44}^0$). Reference state is assumed to be either unstressed or some fixed hydrostatic stressed state. Magnitudes of three principal stresses and strains are measured with respect to the stress and strain in the reference state. To characterize the behavior of isotropic material under stress, one needs three third-order (non-linear) elastic constants taken here as $c_{111}$, $c_{112}$, and $c_{123}$ (Sinha and Kostek, 1995). In this case, triaxially stressed media is approximately equivalent to an orthorhombic anisotropic solid with the principal axes aligned with directions of principal stresses and stiffnesses given by equations (see, Sinha, B. K., 1982, Elastic waves in crystals under a bias: Ferroelectrics, 41, 61–73; Bakulin, A., Troyan, V., and Bakulin, V., 2000c, Acoustoelasticity of rocks: St. Petersburg Univ. Press; and Prioul et al., 2001):

$$c_{11} = c_{33}^0[1 + \Delta c_{11}], \quad c_{22} = c_{33}^0[1 + \Delta c_{22}], \quad (23)$$
$$c_{33} = c_{33}^0[1 + \Delta c_{33}], \quad c_{12} = c_{12}^0[1 + \Delta c_{12}],$$
$$c_{13} = c_{12}^0[1 + \Delta c_{13}], \quad c_{23} = c_{12}^0[1 + \Delta c_{23}],$$
$$c_{44} = c_{44}^0[1 + \Delta c_{44}], \quad c_{55} = c_{44}^0[1 + \Delta c_{55}],$$
$$c_{66} = c_{44}^0[1 + \Delta c_{66}]$$

$$\Delta c_{11} = \frac{1}{c_{33}^0}\{T_{11} + c_{111}E_{11} + c_{112}(E_{22} + E_{33}) + 2c_{33}^0 E_{11}\}$$

$$\Delta c_{22} = \frac{1}{c_{33}^0}\{T_{22} + c_{111}E_{22} + c_{112}(E_{11} + E_{33}) + 2c_{33}^0 E_{22}\}$$

$$\Delta c_{33} = \frac{1}{c_{33}^0}\{T_{33} + c_{111}E_{33} + c_{112}(E_{11} + E_{22}) + 2c_{33}^0 E_{33}\}$$

$$\Delta c_{12} = \frac{1}{c_{12}^0}\{c_{123}E_{33} + c_{112}(E_{11} + E_{22}) + c_{12}^0(E_{11} + E_{22})\}$$

$$\Delta c_{13} = \frac{1}{c_{12}^0}\{c_{123}E_{22} + c_{112}(E_{11} + E_{33}) + c_{12}^0(E_{11} + E_{33})\}$$

$$\Delta c_{23} = \frac{1}{c_{12}^0}\{c_{123}E_{11} + c_{112}(E_{22} + E_{33}) + c_{12}^0(E_{22} + E_{33})\}$$

$$\Delta c_{44} = \frac{1}{c_{44}^0}\left\{\frac{T_{22} + T_{33}}{2} + c_{144}E_{11} + (c_{155} + c_{44}^0)(E_{22} + E_{33})\right\}$$

$$\Delta c_{55} = \frac{1}{c_{44}^0}\left\{\frac{T_{11} + T_{33}}{2} + c_{144}E_{22} + (c_{155} + c_{44}^0)(E_{11} + E_{33})\right\}$$

$$\Delta c_{66} = \frac{1}{c_{44}^0}\left\{\frac{T_{11} + T_{22}}{2} + c_{144}E_{33} + (c_{155} + c_{44}^0)(E_{11} + E_{22})\right\}$$

where $c_{111}$, $c_{112}$, $c_{123}$, are the three third-order (non-linear) elastic constants ($c_{144} = (c_{112} - c_{123})/2$, $c_{155} = (c_{111} - c_{112})/4$), Principal stresses and strains $T_{ij}$ and $E_{ij}$ are related by Hooke's law for the unstressed isotropic rock:

$$\begin{pmatrix} T_{11} \\ T_{22} \\ T_{33} \\ T_{23} \\ T_{13} \\ T_{12} \end{pmatrix} = \begin{pmatrix} c_{11}^0 & c_{12}^0 & c_{13}^0 & 0 & 0 & 0 \\ c_{12}^0 & c_{11}^0 & c_{13}^0 & 0 & 0 & 0 \\ c_{13}^0 & c_{13}^0 & c_{33}^0 & 0 & 0 & 0 \\ 0 & 0 & 0 & c_{44}^0 & 0 & 0 \\ 0 & 0 & 0 & 0 & c_{44}^0 & 0 \\ 0 & 0 & 0 & 0 & 0 & c_{66}^0 \end{pmatrix} \begin{pmatrix} E_{11} \\ E_{22} \\ E_{33} \\ E_{23} \\ E_{13} \\ E_{12} \end{pmatrix} \quad (24)$$

where $c_{11}^0 = c_{33}^0, c_{44}^0 = c_{66}^0, c_{12}^0 = c_{13}^0 = c_{11}^0 - 2c_{66}^0$.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A method for estimating stress characteristics from seismic data comprising:
   receiving seismic data acquired using a plurality of sensors adapted to sense seismic energy, the seismic data representing subterranean characteristics within a subterranean region;
   receiving properties of rock at a location within the subterranean region; and
   estimating one or more stress characteristics for at least a sub-region in said region by combining the seismic data and the rock properties using a relationship between the stress characteristics in the sub-region and elastic stiffness and/or sonic velocity in the sub-region.

2. The method of claim 1 wherein the relationship is based on an effective medium theory.

3. The method of claim 2 wherein the relationship is based on a non-linear elasticity theory.

4. The method of claim 1 wherein the elastic stiffness and/or sonic velocity in the sub-region is obtained from the seismic data and the rock properties.

5. The method of claim 1 wherein the stress characteristics being estimated comprise the whole stress tensor.

6. The method of claim 1 wherein the elastic stiffness comprises elastic constants of the rock, and said step of estimating comprising deriving the elastic constants from the received rock properties.

7. The method of claim 6 wherein the elastic constants include second and third order elastic constants.

8. The method of claim 1 wherein the stress characteristics are effective stress characteristics.

9. The method of claim 1 wherein the stress characteristics are total stress characteristics.

10. The method of claim 1 wherein the estimation step comprises:
   analyzing in the seismic data azimuth and offset dependence of seismic signatures for seismic anisotropy thereby determining a set of anisotropic coefficients;
   identifying directions of minimum, intermediate and maximum stresses from orientation of principal axes of seismic anisotropy and signs of the anisotropic coefficients; and
   inverting said anisotropic coefficients thereby estimating magnitudes of principal stresses in the sub-region using non-linear elastic constants and vertical total stress information derived from the rock properties.

11. The method of claim 1 wherein the sub-region is at least 5 meters away from a nearest existing borehole.

12. The method of claim 1 wherein said estimation step comprises estimating the orientations of principal stress in the sub-region.

13. The method of claim 12 wherein the orientations are estimated using axes of NMO ellipses p-wave and s-wave from a horizontal reflector.

14. The method of claim 12 wherein the orientations are estimated using p-wave and s-wave slowness surface.

15. The method of claim 1 wherein the relationship relies on an assumption of stressed rock weak anisotropy.

16. The method of claim 1 wherein the step of estimating comprises the step of relating vertical sonic velocities and anisotropic coefficients from the seismic data to effective stress magnitudes.

17. The method of claim 1 wherein the rock properties are estimated from laboratory core measurements.

18. The method of claim 1 wherein the rock properties are estimated from measurements made within a borehole.

19. The method of claim 18 wherein the measurements are of nonlinear properties of the rock and are made using a sonic logging tool while changing pressure in the borehole.

20. The method of claim 1 wherein the rock properties are approximated using a relationship similar to the formulae $\mu = c_{44}^0 \rho V_{S0}^2$, and $\lambda = c_{33}^0 - 2c_{44}^0 = \rho V_{P0}^2 - 2\mu$.

21. The method of claim 1 wherein the one or more stress characteristics include magnitude of principal stress.

22. The method of claim 1 wherein the sub-region includes a layer or rock having similar rock properties.

23. The method of claim 1 wherein the seismic data is acquired using 3D p-wave and s-wave surface geophones.

24. The method of claim 1 wherein the seismic data is acquired using multi-azimuth and multi-offset sources in combination with borehole measurements.

25. The method of claim 1 wherein the seismic data is acquired using one or more multicomponent ocean bottom cables.

26. The method of claim 1 wherein the sub-region intersects a trajectory for a planned borehole.

27. The method of claim 1 wherein the sub-region includes area greater than 100 square meters.

28. The method of claim 1 further comprising the step of estimating pore pressure in the sub-region using a relationship between pore pressure in the sub-region and elastic stiffness and/or sonic velocity in the sub-region.

29. The method of claim 1 further comprising the step of repeating the step of estimating for further sub-regions within said region.

30. The method of claim 1 further comprising the step of:
receiving a second set of seismic data representing subterranean characteristics at a different time; and
repeating said step of estimating for said sub-region using said second set of seismic data.

31. A method for estimating pore pressure from seismic data comprising:
receiving seismic data acquired using a plurality of sensors adapted to sense seismic energy, the seismic data representing subterranean characteristics within a subterranean region;
receiving properties of a rock formation within the region; and
estimating pore pressure for at least a sub-region in said region by combining the seismic data and the rock properties using a relationship between the pore pressure in the sub-region and elastic stiffness and/or sonic velocity in the sub-region.

32. The method of claim 31 wherein the sub-region is at least 5 meters away from a nearest existing borehole.

33. The method of claim 31 wherein the relationship is based on an effective medium theory.

34. The method of claim 33 wherein the relationship is based on a non-linear elasticity theory.

35. The method of claim 31 further comprising the step of repeating the step of estimating for further sub-regions within said region.

36. The method of claim 31 further comprising the step of:
receiving a second set of seismic data representing subterranean characteristics at a different time; and
repeating said step of estimating for said sub-region using said second set of seismic data.

37. A system for estimating stress characteristics from seismic data comprising a processor programmed to estimate one or more stress characteristics for at least a sub-region in a subterranean region that is at least 5 meters away from a nearest existing borehole by combining seismic data representing subterranean characteristics within the region and properties of rock at a location within the region using a relationship between the stress characteristics in the sub-region and elastic stiffness or sonic velocity in the sub-region.

38. The system of claim 37 wherein the relationship is based on an effective medium theory.

39. The method of claim 38 wherein the relationship is based on a non-linear elasticity theory.

40. The system of claim 37 wherein the processor is further programmed to analyze in the seismic data azimuth and offset dependence of seismic signatures for seismic anisotropy thereby determining a set of anisotropic coefficients, identify directions of minimum, intermediate and maximum stresses from orientation of principal axes of seismic anisotropy and signs of the anisotropic coefficients, and invert said anisotropic coefficients thereby estimating magnitudes of principal stresses in the sub-region using non-linear elastic constants derived from the rock properties and vertical total stress information.

41. A computer readable medium that is capable of causing a computer to perform steps comprising:
receiving seismic data acquired using a plurality of sensors adapted to sense seismic energy, the seismic data representing subterranean characteristics within a subterranean region;
receiving properties of rock at a location within the subterranean region; and
estimating one or more stress characteristics for at least a sub-region in said region by combining the seismic data and the rock properties using a relationship between the stress characteristics in the sub-region and elastic stiffness and/or sonic velocity in the sub-region.

42. The computer readable medium of claim 41 wherein the sub-region is at least 5 meters away from a nearest existing borehole.

43. The computer readable medium of claim 41 wherein the relationship is based on an effective medium theory.

44. The computer readable medium of claim 43 wherein the relationship is based on a non-linear elasticity theory.

45. The computer readable medium of claim 41 further comprising the step of:
receiving a second set of seismic data representing subterranean characteristics at a different time; and repeating said step of estimating for said sub-region using said second set of seismic data.

46. A method according to claim 1 wherein the estimation step includes removing intrinsic anisotropy effects in the seismic data before the combining of the seismic data and the rock properties.

* * * * *